UNITED STATES PATENT OFFICE.

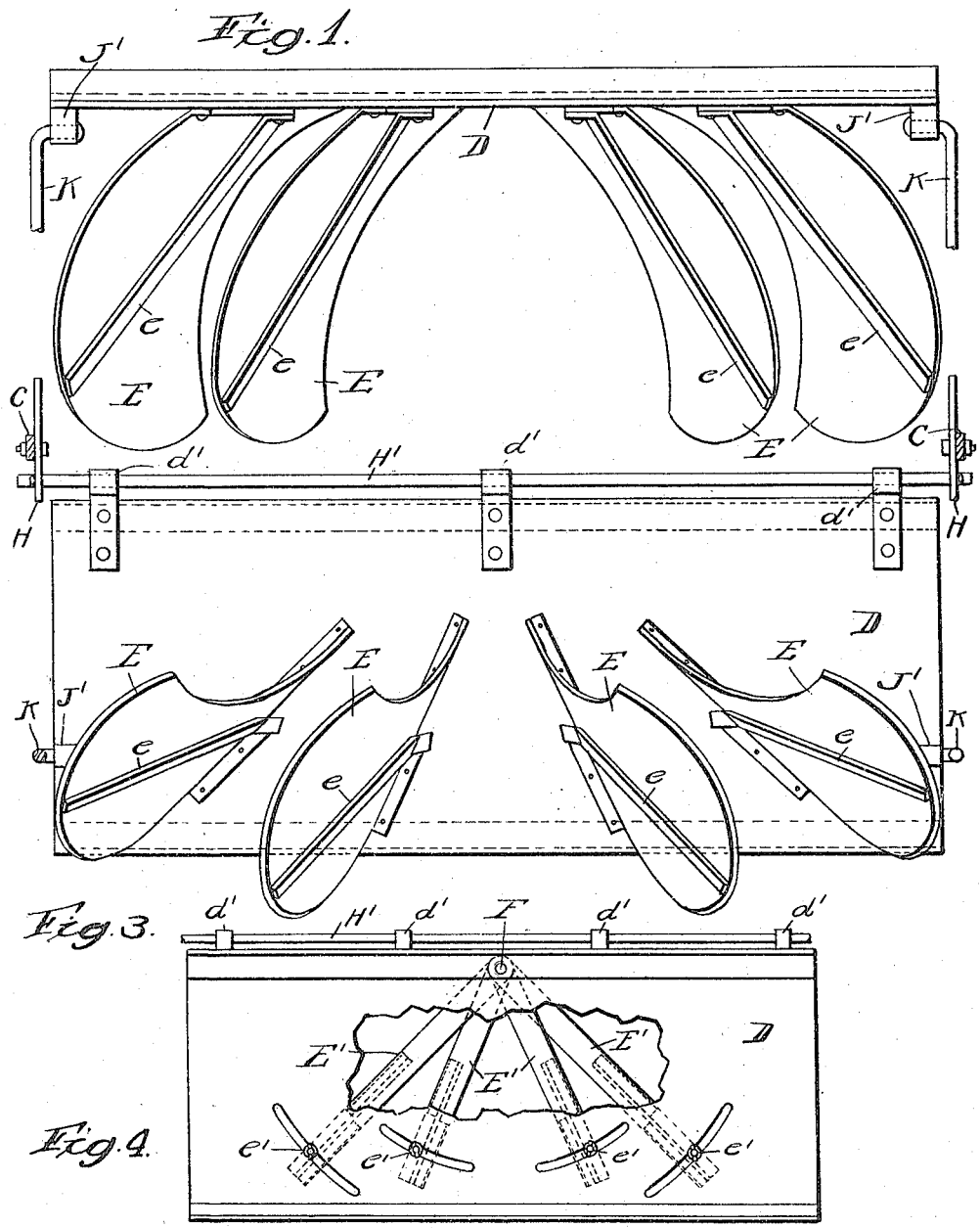

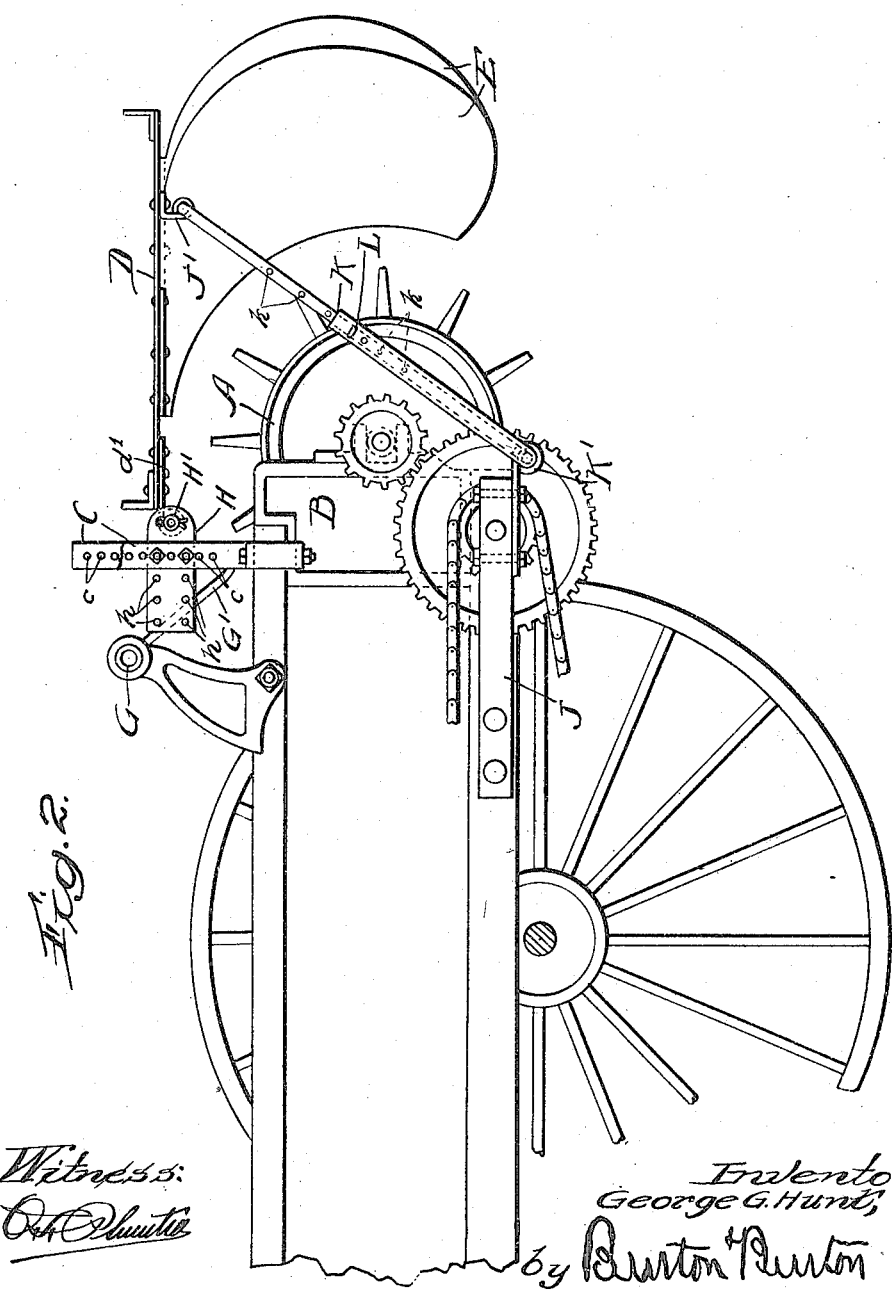

GEORGE G. HUNT, OF PLANO, ILLINOIS, ASSIGNOR TO THE INDEPENDENT HARVESTER COMPANY, OF PLANO, ILLINOIS, A CORPORATION OF ILLINOIS.

WIDE-SPREADING DEVICE FOR FERTILIZER-DISTRIBUTERS.

1,221,863.      Specification of Letters Patent.      Patented Apr. 10, 1917.

Application filed March 25, 1916. Serial No. 86,540.

*To all whom it may concern:*

Be it known that I, GEORGE G. HUNT, a citizen of the United States, residing at Plano, in the county of Kendall and State of Illinois, have invented new and useful Improvements in Wide-Spreading Devices for Fertilizer-Distributers, of which the following is a specification, reference being had to the accompanying drawings, forming a part thereof.

The purpose of this invention is to provide an improved device in a fertilizer distributer for wide spreading of the material discharged by the distributer. It consists in the elements and features of construction shown and described as indicated in the claims.

In the drawings:—

Figure 1 is a rear elevation of the distributer constituting this invention.

Fig. 2 is a side elevation of the rear end portion of the distributer as showing the device in operative position.

Fig. 3 is an inverted plan view of the spreading device.

Fig. 4 is a top plan view showing a modification.

The drawings show the rear end portion of a fertilizer distributer of familiar construction, comprising the beater, A, mounted and actuated in a familiar manner upon the frame structure of the distributer represented by standards, B, at the rear end of the box or fertilizer container. Extended up from the distributer frame are uprights, C, C, one at each side, positioned rearward of the axis of the beater, A, said uprights extending for a considerable distance above the level of the top of the beater, being in a transverse vertical plane which is forward of the transverse arm or shaft, G, which carries the fertilizer check fingers, G¹, of familiar construction. These uprights, C, C, serve to afford pivotal support for a plate, D, which extends rearward above the beater and carries depending from it deflecting or spreading blades, E, which overhang the rear side of and extend rearward from the discharge side of the beater in the path of the material discharged therefrom; said blades being mounted upon said plate, D, at opposite sides of a vertical fore-and-aft plane midway in the length of the beater, the blades at opposite sides of said plane being oppositely divergent from said plane, and each of said blades being deflected outwardly from the vertical plane of its upper edge, the blades at opposite sides of said mid-fore-and-aft plane being deflected in opposite directions from said vertical planes respectively. These divergent and deflected blades being positioned as stated in the path of discharge of the material delivered by the beater receive the impact of said material and deflect it laterally away from the middle fore-and-aft plane. The deflection of the blades from the vertical planes of their upper edges, as stated, should be at such angle as to correspond substantially or approximately with the normal path of the material as it tends to descend by gravity while being projected rearward by the discharging action of the beater, and deflected outward by the divergence of the blades, and the angle of this deflection from said vertical plane being ascertained by experiment, will not usually require to be changed for variation of conditions under which the machine may operate.

The specific means and method of mounting and supporting the blades may be varied very widely. In the form shown in Figs. 1 and 2 of the drawing, the blades are fastened rigidly to said plate, D, in any convenient manner, each blade being preferably provided with a stiffening bar, e, which extends down along the inner side of each rib about midway in its width and at the upper end serves for a stiffening in securing the blade to the plate by means of the rivets as shown. In Fig. 4 there is shown a modification of this construction, the modification consisting in mounting each blade upon a separate backing rib or bar, E¹, so that the blade may be pivotally connected at the forward end of said bar to the plate, D, to permit the blade to be swung about that pivotal attachment to vary the angle of divergence of the blades from each other and from the mid-vertical fore-and-aft plane. When this construction is adopted, the rear end of each of the bars, E¹, is connected to the plate, D, by means of a stud, c¹, extending through a curved slot in the plate, and provided above the plate with a securing nut. All the bars, E¹, in this construction, may be mounted upon a single pivot bolt, F, at the forward end of said bars. Whether the blades are mounted rigidly or pivotally upon the plate, D, the plate, D, is preferably mounted so that it can be moved to carry the blades toward and from the beater, and also preferably so that the plate may be raised and lowered. A convenient construction for such mounting of the plate, D, consists in that illustrated in the drawings, in which brackets, H, H, are mounted adjustably upon uprights, C, C, by means of a multiplicity of bolt holes, $c$, $c$, in said uprights for receiving the bolts which secure the brackets to the uprights, the plate, D, being pivotally mounted upon said brackets by means of pivot ears, $d^1$, $d^1$, at the forward edge of said plate, a pivot rod or pipe, $H^1$, being inserted through said brackets and pivot ears and secured by a cotter pin. The rear or outer side of the plate, D, is supported upon the distributer frame by means of braces, K, K, each comprising two telescoping pipe members, the lower of which is pivotally connected at its lower end to the distributer frame at any convenient point, as by means of a bracket, $K^1$, bolted to the sill, J, and the upper telescoping member of said brace at each side being similarly pivotally connected by means of a pivot hanger or bracket, $J^1$, secured to the plate, D. For extending and shortening these telescoping braces, both members of the braces may be provided with a plurality of pin-holes, $k$, $k$, through which cotter-pins, L, may be inserted at the various degrees of extension of the telescoping brace. The construction described, it will be observed, permits the plate, D, to be directly raised and lowered, by properly adjusting its connections at the uprights, C, and the extension of the telescoping braces; and it also permits it to be pivotally raised and lowered by swinging it about its forward edge pivotal connection to the brackets, H, accompanied with proper adjustment of the telescoping braces. It will be observed that when the forward pivot of the plate, D, is located substantially as shown in the drawings, either the pivotal adjustment or vertical adjustment has the effect to raise or lower the blades; and that the pivotal adjustment has the effect to move the blades toward and from the beater. If a greater range of fore-and-aft adjustment of the blades toward and from the beater is desired than can be conveniently obtained by means of the pivotal movement as above described, such increased range of fore-and-aft adjustment,—toward and from the beater,—may be provided for by extending the brackets, H, and providing them each with a plurality of bolt holes so that they may be adjusted horizontally across the uprights, as well as vertically along the uprights. In such case, a corresponding adjustment of the telescoping braces will be made to preserve the proper elevation of the blades throughout the range of adjustment fore-and-aft.

I claim:
1. In a fertilizer distributer, in combination with a revoluble beater, a spreading device comprising a plurality of blades which at operative position depend at the rear side of the beater in approximately vertical planes divergent rearward from the beater, and means for supporting such blades rigidly in such divergent positions.

2. In a fertilizer distributer, in combination with a revoluble beater, a spreading device comprising a plurality of blades which at operative position depend at the rear side of the beater in approximately vertical planes divergent from each other in the general direction of its discharge; a support for the blades from which they depend, said support being mounted movable with respect to the beater support for carrying the blades toward and from the beater, and means for securing such device in the desired position within the range of such movement.

3. In a fertilizer distributer in combination with a revoluble beater, a spreading device comprising a plurality of blades and means for supporting them at the discharge side of the beater, said blades at opposite sides of a fore-and-aft vertical plane midway in the length of the beater being oppositely divergent from said plane, and being also oppositely deflected from the vertical planes respectively in which their upper edges are secured.

4. In a fertilizer distributer in combination with a revoluble beater, a spreading device comprising a plurality of blades and means by which they are supported depending rearward of the discharge side of the beater, said means comprising supporting members extending up from the distributer frame forward of said discharge side, and a member from which the blades depend, pivotally mounted upon said supporting members, said pivotally mounted member extending rearward above the beater and beyond the same for carrying said blades pivotally connected at both ends, and braces extending from the outer or rear portion of said pivoted member to the distributer frame for completing the support of said member.

5. In a fertilizer distributer in combination with a revoluble beater, a spreading device comprising a plurality of blades and means by which they are supported depending rearward of the discharge side of the beater, said means comprising supporting members extending up from the distributer frame forward of said discharge side, and a member from which the blades depend, pivotally mounted upon said supporting members; said pivotally mounted member extending rearward above the beater and beyond the frame for carrying said blades, and braces pivotally connected at both ends extending from the outer or rear portion of said pivoted member to the distributer frame for completing the support of said member; means by which said pivoted member is adjusted up and down at its pivotal connection with said supporting members, and means for correspondingly adjusting said braces.

6. In a fertilizer distributer, in combination with a revoluble beater, a spreading device comprising a plurality of blades and a supporting plate from which said blades depend; supports upon which said plate is pivoted at the forward side at a vertical plane forward of the discharge side of and above the beater, and means for supporting the outer or rear side of said plate and for adjusting said outer or rear side up and down about said pivotal support.

7. In a fertilizer distributer in combination with a revoluble beater, a spreading device comprising a supporting member extending above the beater and rearward therefrom; a plurality of blades depending from said supporting member behind the beater, said blades at opposite sides of a fore-and-aft vertical plane midway in the length of the beater being oppositely divergent from said mid-plane and being also oppositely deflected from the vertical planes in which their upper edges respectively are situated, said blades being pivoted to said supporting member at their upper edges, and means for swinging them about their pivotal connections to the means for positively adjusting said supporting means to position the outer side of said plate positively at different heights.

In testimony whereof, I have hereunto set my hand at Plano, Illinois, this 22nd day of March, 1916.

GEORGE G. HUNT.

Copies of this patent may be obtained for five cents each, by addressing the "Commissioner of Patents, Washington, D. C."